United States Patent Office 3,486,338
Patented Dec. 30, 1969

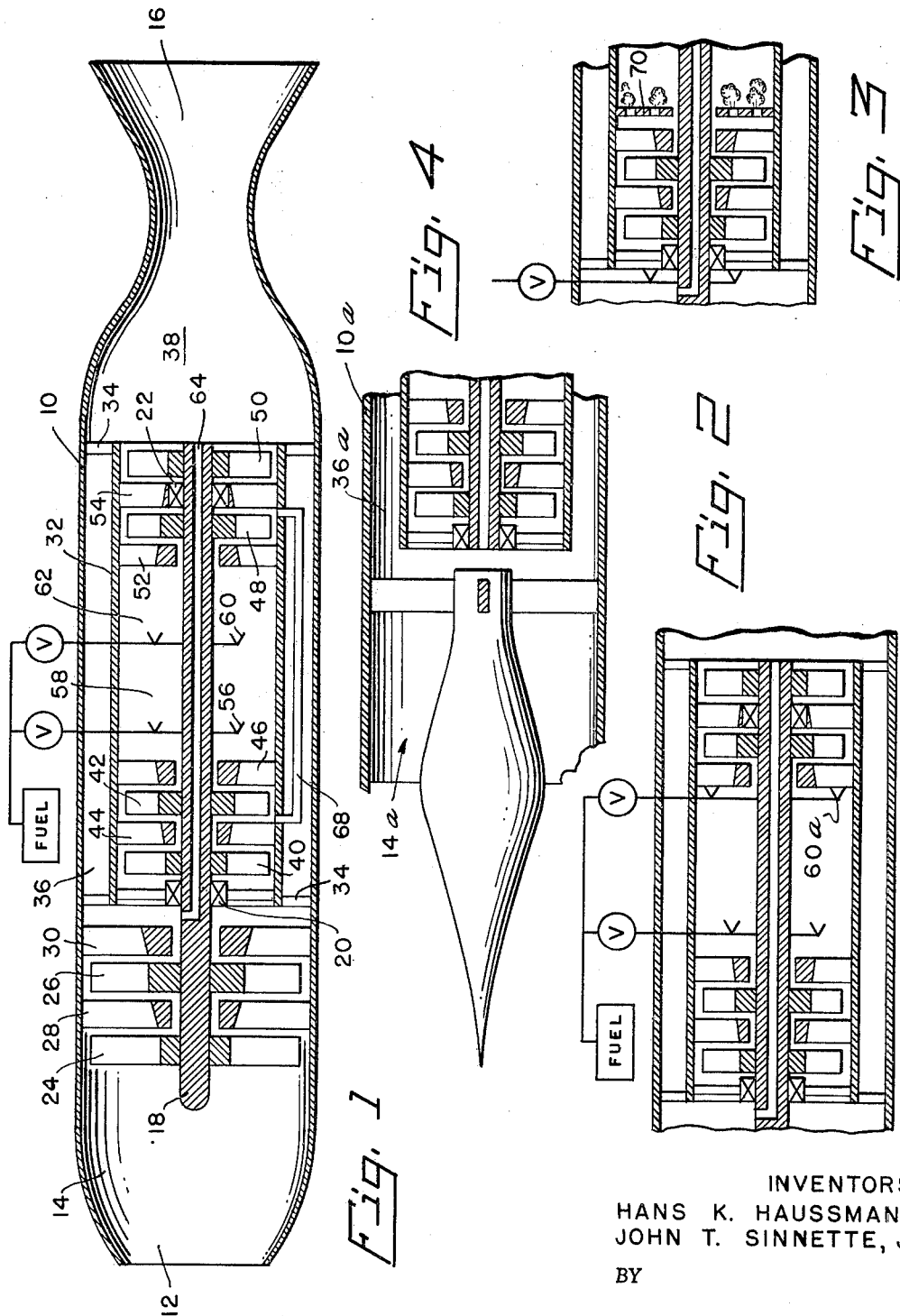

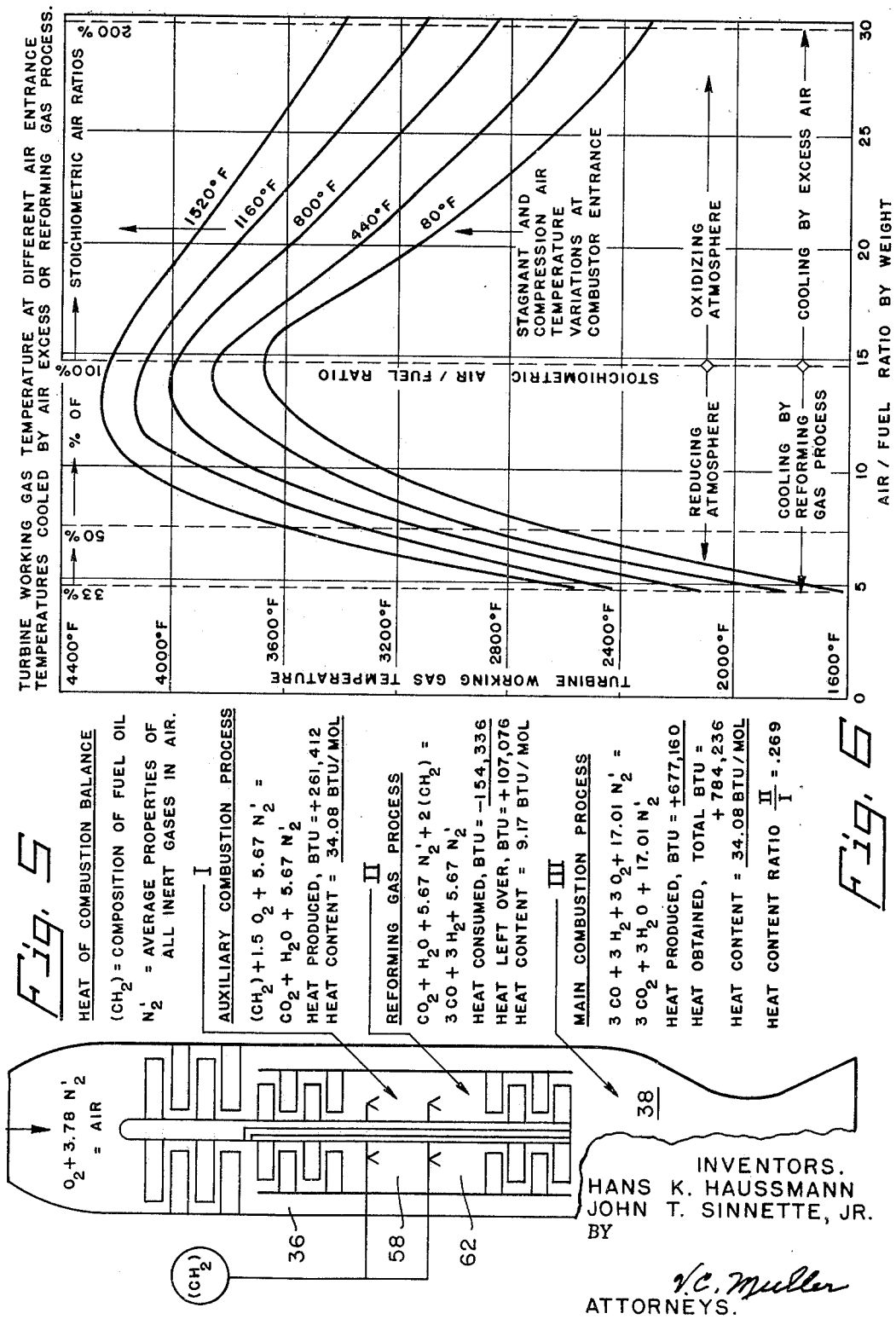

3,486,338
AIR BREATHING MISSILE
Hans K. Haussmann, 278 N. Alta Vista, Monrovia, Calif. 91016, and John T. Sinnette, Jr., 2251 Spaulding Place, Altadena, Calif. 91001
Filed Apr. 16, 1959, Ser. No. 806,986
Int. Cl. F23v 1/02; F02k 3/00
U.S. Cl. 60—207                                           18 Claims The invention described herein may be manufactured and used by or for the Government of the United States of America for governmental purposes without the payment of any royalties thereon or therefor.

This invention relates, broadly, to improvements in process and apparatus for producing a continuous flow of hot gases under pressure employing, as a source of energy, a liquid fuel and ambient air. More particularly, it relates to novel process and apparatus, most closely related to those of jet engines of the turbo type, but differing therefrom, principally, in that the large excesses of air normally delivered to the combustion chamber of the conventional turbo-jet engine are omitted and the mode of operation modified to produce novel and improved results. As will subsequently appear, the invention finds one of its important uses as an "air breathing" missile which may be employed to carry a pay load of explosive or the like, or as a thrust device for propelling a suitable vehicle such as manual or other controlled aircraft through the atmosphere.

Unlike rockets, which carry their propellant consisting of fuel and oxidant and which may be propelled outwardly beyond and independent of the atmosphere, the air breathing missile must receive its oxidant from the atmosphere. The former has some advantages, particularly for extremely long ranges, in that it may be propelled through space without experiencing any substantial drag. The oxidant supply which it carries during its flight through the atmosphere is dead load, however, added to the weight of the apparatus. The air breathing missile on the contrary, while it may experience greater drag in its trajectory within the atmosphere, is not required to carry its oxidant which thereby permits it to carry a considerably larger fuel supply for the same overall weight. This amount of oxidant far exceeds the amount of fuel required for the compression work of corresponding amounts of air. Ramjet engines fall into a similar category as turbo-jet engines, the principal difference being that the latter do not require a mechanically driven air compressor, the function of the latter being performed by ram pressure resulting from the high velocity of this type of vehicle.

For certain fields of application, the turbo-jet and ramjet engines are now approaching the limits of their utility and improvements will be necessary if this field of utility is to be extended. For example, as velocities of the turbo-jet engine are increased it will approach conditions wherein air stagnation temperatures will be reached at which the adiabatically compressed air can no longer be used to cool the temperature of the combustion flame to turbine operating conditions within such highly oxidizing atmospheres. Obviously, its limit of velocity must necessarily be somewhat below this point to remain operable. While ram-jets are not so severely affected by this increase in velocity they, nevertheless, also have velocity limitations.

In the field of warfare, considerable emphasis is presently being placed on the long range ballistic missile which travels, for the greater part of its trajectory, above the atmosphere. Despite its high velocity and long range, it has some disadvantages, particularly, its frozen terminal trajectories and narrow field of its apogee which render it subject to detection and counter-measures. For some tactical purposes, therefore, the missile propelled through the atmosphere would have certain advantages since its position below the horizon of the detecting device would be more difficult to discover and provide a timely counter-measure. Its flight path should also be irregular near its terminal to render ineffective any counter-measure. Since the ramjet is not sufficiently flexible in rapid changes of flight direction and speed, it becomes apparent that the turbo-jet type engine, which has these characteristics, could probably have considerably better utility in the tactical field referred to within the atmosphere, provided its velocity and performance could be improved. The same advantages can be used for carrying space vehicles on inclined trajectories up to high altitudes and velocities to minimize the propellant load and the thrust required by using the surrounding air as oxidant without hampering quick response to guidance control signals.

Since the temperature of the gases passing through the turbine blades of the gas turbine of the turbo jet engine has been recognized as one of the limiting factors in its further development, attempts have been made to cope with this problem in various ways. For example, proposals have been made to cool the turbine blades internally and reject the absorbed heat to a heat sink; also, turbine blading of more heat resistant materials, sometimes coated with ceramics to protect same against the destructive action of the hot oxidizing atmosphere, have been proposed. Thirdly, liquid monopropellants decomposed in separate pressure chambers have been proposed. In this latter type called turbo rocket engines, a non-oxidizing turbine working gas is attained.

The first has the disadvantage that air flow heat exchangers severely increase air drag and become inoperable a high air stagnation temperatures; also, it is difficult to internally cool the blading. The second proposal has met with some success; however, uncoated turbine blades can withstand only limited temperature increases in oxidizing atmospheres and complete protection of coated turbine blades against dust particles and ashes is still difficult since even very small disturbances of the delicately balanced turbine wheels causes their destruction. The third proposal is probably of advantage only for short range interceptor aircraft since the heat of combustion of all practicable monopropellants is considerably lower than that of hydrocarbon fuels.

One of the broad and general objects of this invention is to provide improved process and apparatus for increasing the performance characteristics of jet engines and extend the limitations of performance and velocity of same beyond present recognized limits, employing presently known construction materials as molybdenum for turbine blades in the reducing working gas of turbo rocket engines.

Another object is to provide improvements in process and apparatus for use in turbo-jet engines for obviating present requirements of adding excessive amounts of cooling air before the turbine entrance which increase the drag of the engine, especially at high velocities.

Another object is to provide a jet engine, the turbine of which operates in a reducing atmosphere.

A further object is to provide a jet engine which will operate on inexpensive vanadium ash producing fuels, heretofore producing turbine blade corrosion in an oxidizing atmosphere.

Still further objects, advantages and salient features will become more apparent from the description to follow, the appended claims, and the accompanying drawings, in which:

FIG. 1 is a longitudinal central section through a turbo-jet engine;

FIG. 2 is a similar partial section illustrating a modification;

FIG. 3 is a similar partial section illustrating another modification;

FIG. 4 is a longitudinal central section of the forward end of any of the preceding figures, illustrating a ramjet application of the invention.

FIG. 5 is an example of a heat combustion balance of the invention; and

FIG. 6 is a diagram illustrating the dependence of the actual temperatures for the turbine working gases from the air fuel ratios.

Referring now in detail to the drawing which diagrammatically illustrates apparatus and process forming the subject of the invention, and first to FIG. 1, a generally elongated casing or tube 10 is provided with an air intake 12 at its forward end, a diffuser 14 downstream from the air intake, and converging-expanding nozzle 16 at the rear end through which gases exhaust to provide thrust.

Upon the forward end of shaft 18, rotatably mounted on bearings 20, 22 is disposed air compressor rotor blading 24, 26 associated with stators 28, 30, this being illustrated as of the two-stage axial flow type, and referred to hereinafter as a first or main air compressor. The construction so far described is conventional and well known in the art. A casing 32 is disposed within casing 10, and supported in any suitable manner, such as by webs 34, to provide an annular conduit 36 communicating the main compressor with main combustion chamber 38. The first or main air compressor also communicates with an air compressor comprising rotor blading 40, 42 and stators 44, 46 and referred to hereinafter as a second or auxiliary air compressor. To the rear end of the shaft is affixed gas turbine rotor blading 48, 50 associated with stators 52, 54, forming a turbine for rotating the rotors of both compressors.

The space between the rear or exhaust end of the auxiliary air compressor and the front or gas entry end of the turbine forms an auxiliary combustion chamber in which reactions take place which form an important part of the invention. The forward portion of this chamber, where fuel injection nozzles 56 are disposed, may be defined as an auxiliary stoichiometric combustion chamber or zone 58, and the rearward portion, wherein fuel nozzles 60 are disposed, may be defined as a combustion gas reformer chamber or zone 62.

In the operation of the apparatus so far described, air enters inlet 12 and its velocity head is converted to pressure head in diffuser 14 after which it is compressed by passing through the first or main compressor, all as is conventional in the prior art. The compressed air delivered from the first or main compressor then divides into two flow paths, one path being through conduit 36 to main combustion chamber 38 and the other being through the auxiliary compressor wherein it is further compressed and delivered to the auxiliary combustion chamber. In this chamber liquid fuel, such as a hydrocarbon, is delivered through nozzles 56 under suitable rate of flow to effect substantially stoichiometric combustion. The temperatures of the gases at this point may be of the order of 3600° F. and would, it not cooled, be in excess of that which the gas turbine could operationally withstand. In the prior art, as previously alluded to, the counterpart of these gases would be cooled by a large excess of air prior to delivery to the gas turbine. In this invention cooling is effected by injecting fuel through nozzles 60 into the reformer zone. In this zone the fuel evaporates, decomposes and reacts with the combustion products delivered thereto, an endothermic process which cools the gases prior to delivery to the gas turbine. The amount of fuel added may be controlled to obtain the desired temperature, say of the order of 2000° F., prior to entry into the gas turbine.

The now fuel-rich gases pass through the turbine and expand, rotating the turbine, which in turn, rotates the main and auxiliary air compressors. The gases delivered from the turbine into main combustion chamber 38 are still fuel-rich and react with the air delivered through conduit 36 to provide substantially stoichiometric combustion in main combustion chamber 38, from which they exhaust through nozzle 16 to provide thrust.

Also illustrated in FIG. 1 is a central passageway 64 in shaft 18 communicating the first compressor with the combustion chamber, air passing through the shaft being utilized for cooling the hubs of the turbine blading and for providing an axial jet of air into the combustion chamber to improve mixing and burning characteristics in the combustion chamber. When not desired, it is to be understood that this feature may be omitted.

Another feature illustrated in FIG. 1 is an air by-pass conduit 68 which bleeds air from the first stage of compression of the auxiliary compressor to the stator zone between the two stages of the turbine. With this construction the air, so delivered, can be proportioned to react with the products entering the second stage of the turbine to elevate the temperature and thus provide the same working gas temperature in each stage of the turbine, rather than two different temperatures as would occur in the absence of the by-pass air. This not only permits utilizing the maximum temperature at each stage of blading but reduces the work required of the auxiliary compressor and, in turn, reduces the power requirements of the turbine. When not desired it is to be understood that this feature may also be omitted.

The invention, as illustrated by FIG. 2, is essentially the same as that of FIG. 1 and its modifications except that nozzles 60a are arranged to spray fuel into contact with the turbine parts, rather than somewhat ahead of the turbine in the reformer zone. With this type of injection the fuel contacts the turbine blading and stators, directly cooling same by conduction heat transfer and evaporation and the reforming action takes place between the inlet and outlet ends of the turbine. This permits higher temperatures across the turbine than is possible with the injection as shown in FIG. 1.

The invention, as illustrated by FIG. 3, is essentially the same as described for FIGS. 1 or 2 except that the fuel added for the stoichiometric combustion is injected ahead of the auxiliary compressor, thus cooling the air delivered from the previous stage of compression and permitting higher compression without excessive power requirements. Combustion takes place after the fuel and air have been compressed as they issue from a flame holder 70.

FIG. 4 illustrates a modification of any of the preceding figures wherein the invention is employed with a ram jet. With this construction the main compressor is omitted and in lieu thereof a suitable diffuser 14a is provided at the forward end of the outer casing, shown as casing 10a. From the diffuser, rather than from the main compressor as in the previous figures, air is delivered to passageway 36a and to the auxiliary compressor. The confinement of part of the fuel combustion between compressor and turbine of this engine, as compared with a conventional ram jet engine, provides an increased staytime and reaction rate. The inertia of the turbine-compressor aggregate helps further to overcome the effects of sudden directional and velocity changes of the vehicle compared to pure ramjet engines.

FIG. 5 illustrates an example of a heat of combustion balance of the invention wherein the fuel is selected as kerosene ($CH_2$) and $N_2'$ signifies average properties of all inert gases in air (principally nitrogen). It will be noted that at stage I in auxiliary stoichiometric chamber or zone 58 the heat content is 34.08 B.t.u./mol and the heat produced is 261,412 B.t.u. At stage II additional fuel is then injected into reformer gas chamber or zone 62 which consumes 154,336 B.t.u., leaving a heat content of 9.17 B.t.u./mol and 107,076 B.t.u. which heat content enters the turbine. As will be apparent, this heat content is only about ¼ (.269) of the heat content which would have entered the turbine in the absence of the reformer process. At stage III in combustion chamber 38 the fuel rich exhaust from the turbine now reacts with the air delivered through conduit 36 against producing a heat content of 34.08 B.t.u./mol which equals the heat content at stage I. It is apparent, therefore, that as compared with a conventional turbojet which does not add the fuel for a gas reforming process, there is no heat loss. As will be apparent, the foregoing considerations neglect the heat transferred to mechanical work within the turbine. This, however, does not change the heat balance since this work is the mechanical equivalent of the heat energy subtracted from the total and is convertible back to its heat equivalent.

In FIG. 6 the dependence of the actual temperatures for the turbine working gases from the air/fuel ratios are shown in the form of a diagram which also indicates the influence of the air entrance temperature which increases with increasing missile velocity. In conventional turbojet engines, the permissible temperature of the turbine working gas is limited by the heat resistance of the turbine blade construction material in oxidizing atmospheres. For this reason more than 200% of the stoichiometric amount of air is used to accommodate the combustion flame temperature to turbine working conditions. This increases the size and the weight of compressor and turbine in the same proportions. The result of this influence is an increase in the drag of both wing structure and engine, resulting in a severe impediment for use of such devices at high missile velocities. The field below 200% is shown in the diagram because it indicates the futility of operating in this region with usual combustion processes. Even at the lowest indicated air entrance temperature and 200% of air, the gas turbine temperature would exceed 2300° F. This is far above the usual limit of 1600° F. and even higher than tolerable for the most advanced experimental methods and materials. However, this behavior is drastically changed below 100% of the stoichiometric air/fuel ratio. In this case, a reducing atmosphere is obtained which allows the use of construction materials with much higher temperature limits than in oxidizing atmospheres. Such materials are already well known from experiences with turbo air rockets. Moreover, a sharp reduction in the temperature of the turbine working gas is obtained. This is a consequence of the absorption of heat by a chemical process (called reforming gas process) and not by dilution with air of simultaneously increasing entrance temperature. For the final combustion of the fuel rich turbine working gas, stoichiometric air/fuel ratios and higher pressures can be used than for injection of fuel into the oxygen rich turbine exhaust gases of conventional turbojet engines. This results in improved sizes, thermodynamic efficiencies, and fuel consumption rates of the engines of the present invention which makes them especially applicable for high velocities and extended flight times.

Obviously many modifications and variations of this invention are possible in the light of the foregoing teachings. For example, while a liquid hydrocarbon fuel has been previously referred to and is set forth in the appended claims, it will be understood that such fuel is intended as one which is essentially a hydrocarbon but which may contain other elements or compounds which are not strictly hydrocarbons. Also, while modifications have been described wherein fuel is injected ahead or after the auxiliary compressor, the fuel may be proportional, as desired, for injection both ahead and after such compressor. Similarly, while modifications have been described wherein fuel is injected into a gas reforming zone ahead of the turbine or within the turbine, this fuel may be proportioned, as desired, for injection both ahead and within the turbine. The ratios of air to fuel are not limited to any specific amounts referred to. Similarly, if it is so desired, the ratio of air to fuel in the main combustion chamber may be varied to produce higher than stoichiometric air to fuel ratios. It is therefore to be understood that the invention may be practiced with these examples or otherwise than as specifically described within the scope of the appended claims.

What is claimed is:

1. The method of producing thrust from a continuous flow of hot gas under pressure comprising the steps of compressing ambient air, delivering a main portion of the compressed air to a main combustion zone, further compressing the remaining portion of the compressed air and delivering same to an auxiliary combustion zone, adding a first liquid hydrocarbon fuel to said remaining portion of the compressed air at a rate to effect substantially stoichiometric reaction with the air delivered to said auxiliary zone to produce products of combustion at a predetermined temperature, delivering said products of combustion to a gas reformer zone, adding a second liquid hydrocarbon fuel to the products of combustion thereby producing reformer gas at a lower temperature than said predetermined temperature and containing substantial quantities of hydrogen and carbon monoxide, flowing the reformer gases through a turbine, compressing said remaining portion of the compressed air by power delivered by the turbine, exhausting the reformer gases passing through the turbine into said main combustion zone wherein the hydrogen and carbon monoxide contained therein react with said main portion of air delivered thereto, thereby producing said hot gas under pressure, delivering and increasing the velocity of said hot gas from said combustion zone to maintain pressure in said main combustion zone substantially above ambient pressure, and subsequently delivering said hot gas to the ambient medium to produce thrust.

2. A method in accordance with claim 1 wherein said ambient air is compressed by ram pressure.

3. A method in accordance with claim 1 wherein said ambient air is compressed by power delivered by said turbine.

4. A method in accordance with claim 1 wherein said first liquid fuel is added to said remaining portion of compressed air subsequent to the further compressing of same.

5. A method in accordance with claim 1 wherein said first named liquid fuel is added to said remaining portion of compressed air prior to the further compressing of same.

6. A method in accordance with claim 1 wherein said reformer gas is produced before it is delivered to the turbine.

7. A method in accordance with claim 1 wherein said reformer gas is produced within the turbine.

8. A method in accordance with claim 1 wherein said remaining portion of compressed air is further compressed in a plurality of stages; said reformer gas is delivered through a plurality of stages through the turbine; and air is delivered from between stages of further compression to a zone between stages in the turbine.

9. A method in accordance with claim 1 including the step of cooling the turbine by conduction of heat therefrom to another portion of said first named compressed air.

10. Apparatus for producing thrust from a continuous flow of hot gas from under pressure comprising means for compressing ambient air, means for delivering a main portion of the compressed air to a main combustion chamber, means for further compressing the remaining portion of the compressed air and delivering same to an auxiliary combustion chamber, means for adding a first liquid hydrocarbon fuel to said remaining portion of the compressed air at a rate to effect substantially stoichiometric reaction with the air delivered to said auxiliary combustion chamber to produce products of combustion at a predetermined temperature, means for delivering said products of combustion to a gas reformer zone, means for adding a second liquid hydrocarbon fuel to the products of the combustion thereby producing reformer gas at a lower temperature than said predetermined temperature and containing substantial quantities of hydrogen and carbon monoxide, a turbine through which the reformer gases are adapted to pass, means for delivering power delivered by said turbine to the means for compressing said remaining portion of the compressed air, means for exhausting the reformer gases passing through the turbine into said main combustion chamber wherein the hydrogen and carbon monoxide contained therein react with said main portion of air delivered thereto, thereby producing said hot gas under pressure, and nozzle means disposed rearwardly of said main combustion chamber adapted to maintain pressure in said main combustion chamber substantially above ambient pressure and for increasing the velocity of gas flowing therethrough for subsequent delivery to the ambient medium to produce thrust.

11. Apparatus in accordance with claim 10 including means for compressing said ambient air by ram pressure.

12. Apparatus in accordance with claim 10, including means for compressing said ambient air by power delivered by said turbine.

13. Apparatus in accordance with claim 10 including means for adding said first named fuel to the said remaining portion of compressed air subsequent to the further compression of same.

14. Apparatus in accordance with claim 10 including means for adding said first named liquid fuel to said remaining portion of compressed air prior to the further compressing of same.

15. Apparatus in accordance with claim 10 adapted to produce said reformer gas before it is delivered to said turbine.

16. Apparatus in accordance with claim 10 adapted to produce said reformer gas within said turbine.

17. Apparatus in accordance with claim 10 wherein the means for further compressing the remaining air comprises a multi-stage compressor and said turbine is of the multi-stage type, and means for delivering a portion of the air from between the stages of the multi-stage compressor to a zone between stages of the turbine.

18. Apparatus in accordance with claim 10 including means for delivering another portion of said first named compressed air to the turbine for cooling same.

References Cited

UNITED STATES PATENTS

| | | | |
|---|---|---|---|
| 2,482,505 | 9/1949 | Pierce | 60—35.6 |
| 2,655,786 | 10/1953 | Carr | 60—35.6 XR |
| 2,660,032 | 11/1953 | Rosenthal | 60—39.02 |
| 2,880,574 | 4/1959 | Howald | 60—35.6 |
| 2,520,967 | 9/1950 | Schmitt | 60—35.6 X |
| 2,595,505 | 5/1952 | Bachle | 60—39.67 XR |
| 2,602,289 | 7/1952 | Anxionnaz et al. | 60—39.67 XR |

FOREIGN PATENTS

| | | |
|---|---|---|
| 626,174 | 7/1949 | Great Britain. |
| 672,660 | 5/1952 | Great Britain. |

SAMUEL FEINBERG, Primary Examiner

U.S. Cl. X.R.

60—39.66, 208, 261, 262, 264